United States Patent [19]

Kerivan

[11] Patent Number: 4,614,508

[45] Date of Patent: Sep. 30, 1986

[54] DRIVE MECHANISM ESPECIALLY FOR WEB FEED TRACTORS

[75] Inventor: Leo Kerivan, Somerset, Mass.

[73] Assignee: Precision Handling Devices Inc., Fall River, Mass.

[21] Appl. No.: 707,254

[22] Filed: Mar. 1, 1985

[51] Int. Cl.4 .......................... F16H 7/02; G03B 1/30

[52] U.S. Cl. .................................... 474/153; 474/152; 226/74

[58] Field of Search ................................ 474/152–154, 474/162, 203, 184, 901; 226/74, 170

[56] References Cited

U.S. PATENT DOCUMENTS

| | | | |
|---|---|---|---|
| 35,192 | 10/1901 | Dodge | 474/152 X |
| 35,193 | 10/1901 | Dodge | 474/152 X |
| 3,825,162 | 7/1974 | Hubbard | 226/74 |

FOREIGN PATENT DOCUMENTS

| | | | |
|---|---|---|---|
| 0548025 | 3/1932 | Fed. Rep. of Germany . | |
| 0555437 | 7/1932 | Fed. Rep. of Germany | 153/ |
| 0000853 | of 1888 | United Kingdom | 474/154 |

*Primary Examiner*—Stephen J. Novosad
*Assistant Examiner*—Thuy M. Bui
*Attorney, Agent, or Firm*—Martin LuKacher

[57] ABSTRACT

A drive mechanism having a sprocket and a belt with inter-engaging lugs and receptacles on the belt and sprocket, respectively, wherein orthographic motion is obtained of the lugs into and out of the receptacles so as to provide for smooth, high efficiency transmission of drive forces by providing a fulcrum at inter-pitch spacing positions about which the belt bends along a radius centered at the fulcrum to bring the lugs directly into registry with the receptacles in the sprocket. The system provides virtual sprocket teeth, thereby effectively doubling or multiplying the number of teeth on the sprocket, compared to lugs on the belt so that a small, low-inertia, sprocket-belt drive system effectively provides the smoothness of transmission of a system with twice or greater the number of sprocket teeth than lugs, but without the cost of such additional teeth and lugs and without sacrificing belt life due to additional flexures of the belt. The drives system is embodied in a web feed tractor wherein the belt has pins which enter into and engage perforations in a web for feeding the web. The fulcrums also locate the belt so as to accommodate the difference between the pitch of the belt lugs and the pitch of the sprocket teeth. The fulcrums also accommodate the arch in the belt when located on the sprocket due to the flexure of the belt about the edges of the lugs thereby providing for uniform registration of the drive system and spacing of lines printed on the web (paper) of a printer equipped with a tractor drive using the system.

28 Claims, 10 Drawing Figures

DRIVE MECHANISM ESPECIALLY FOR WEB FEED TRACTORS

DESCRIPTION

The present invention relates to drive mechanisms, and particularly to drive mechanisms having belts and sprockets which are in driving engagement with each other during operation.

The invention is especially suitable for use in a tractor web feed mechanism wherein a belt having pins which engage perforations in the web and lugs which engage receptacles between the teeth of a sprocket are driven by the sprocket which is in turn driven by a motor or other drive. The term sprocket, as used herein is synonymous with the term drive pulley, as sometimes used in tractor or timing belt drives. The term lug is also synonymous with the term teeth, which is sometimes used in describing the projections on the underside of a timing belt or tractor belt. While the invention is especially suitable for use in web feed tractors, many features of the invention are applicable to and may be used in providing improved power transmission (higher torques) and smoother, less heat producing (cooler) drives which utilize sprockets and belts in any fluid medium, such as air or hydraulic liquids.

It has been discovered, in accordance with the invention, that a principal cause of irregularities and errors in the displacement of the belt in a sprocket-belt drive mechanism is due to misregistration between the incoming lug on the belt and the receptacle in the sprocket. The surface of the lug and the surface of the receptacles do not mate exactly with each other as they engage. Rather, there is an impact, usually near the edge of the receptacle. Drive force and motor torque is wasted in seating an incoming lug into a receptacle in the sprocket. The smoothness of the transmission of motion is adversely affected, which in pronounced cases appears as stuttering of the belt. Also, the belt is subject to flexures which can diminish its life. Heat can be generated which also deteriorates belt life, especially when the belt and sprocket are made of materials, such as plastics, which do not readily dissipate heat.

The lack of registration and the displacement error are especially pronounced when the sprocket has a small number of teeth, for example five or six teeth, and is even further aggravated when the pitch of the teeth on the sprocket differs from the pitch of the lugs on the belt.

A principal cause of the problem, which has been discovered in accordance with the invention, is the lack of orthographic motion of the lug into the receptacle in the sprocket. As the belt wraps itself around the sprocket, a portion of the belt, between the lug entering the receptacle and the point of contact of the belt with the peripheral surface of the outside circumference of the sprocket (i.e. the surface of the tooth preceding the receptacle), has an ever-decreasing length or radius about which the belt turns toward the sprocket. The curve described by an ever-decreasing radius, which varies as a function of the circumference of a circle, is an involute curve. The entering lug thus hooks into the receptacle. The velocity of the lug and the surfaces of the receptacle do not match each other, due to the difference in path lengths. Therefore, there is a discrete difference in kinetic energy in the direction of rotation of the sprocket. This difference in kinetic energy and the interference of the engaging surface of the lug and of the receptacle militate against the smooth transmission of power and driving force. In step drives, as in printers, which operate at high stepping rates (rotational velocity), the inter-engagement error may differ from tooth to tooth, thereby providing for different step lengths of the belt and varying line spacing when the belt is a tractor belt used to feed perforated paper through the printer which prints along the lines. The drive motor must also provide additional torque to force the lug into the receptacle, and also because the component of force applied to the lug before the lug becomes seated is not directly perpendicular to the belt surface (i.e. along a diameter of the sprocket through the center of the lug) and is not effective to drive the belt. Larger drive motors and more rugged gear systems are then required than would otherwise be necessary.

Since the invention provides for orthographic motion of the lugs into the sprocket receptacles, it provides greater freedom of design of the shape of the lugs and of the receptacles in the sprocket or, in other words, the shape of the sprocket teeth. The teeth may range from positive to negative involute or circular curve shapes. A negative involute or circular curve shape may be preferred, since it provides optimal sliding cam action for plastic or plastic to metal surface contacts. Moreover, a negative curve shape minimizes the pressure angle between the tooth and lug (made possible by the long pivot radius and its location). Since the driving force varies with the cosine of the pressure angle, it can be maximized with the tooth shapes which, but for the invention, would not be suitable.

The foregoing problems in sprocket-belt drives manifest themselves especially in web feed tractors. Such tractors utilize precision drive mechanisms wherein the tractor belt, from which pins project into perforations in the driven web, has lugs which engage the receptacles of a sprocket. The sprocket is driven by a drive mechanism, usually from a stepper motor through a gear train. Such tractors and the design of their belt and sprocket drive mechanisms are illustrated in the following U.S. Patents: Hubbard, U.S. Pat. No. 3,825,162 issued July 23, 1974, and U.S. Pat. No. 4,199,091 issued Apr. 22, 1980. In tractors, such as described in U.S. Pat. No. 3,825,162, the lugs are hemi-cylindrical drive rollers which have flat surfaces perpendicular to the diameter against which the flexible elongated portion of the belt is located. This flexible portion is an endless or connectable band of flexible material, as described in detail in the U.S. Pat. No. 3,825,162. It is desirable that the sprocket have a small diameter for low inertia. It is also necessary, in order to meet the line feed spacings which have been established for tractor feeds that the belt and paper be driven a certain distance, i.e., 2.5 inches (63.5 mm), per revolution of the sprocket. In addition the flexible portion of the belt effectively is attached to the flat portion of the lugs, which lie along the diametral plane through the lugs. Accordingly, the belt forms an arch because the bending forces (couples) are applied to the flexible belt at the edges of the rollers when adjacent rollers are in their receptacles in the sprocket. The feed of the belt per revolution, which is required by printing standards, and the arch result in the pitch of the belt lugs being larger than the pitch of the teeth of the sprocket. The mismatch and displacement errors and irregular feeding motion are most pronounced when a small sprocket having few teeth is used. Tractors have been made available having more drive lugs than pins and which use sprockets having a larger number of teeth. Increasing the number of teeth in the sprocket provides a smoother drive since it reduces the mismatch between the belt lugs and the sprocket receptacles. Such tractors are available from Precision Handling Devices, Inc. of Assonet, Mass., U.S. (Xactron Models 1040 and 1060). It is, of course, desirable to provide a minimum number of lugs on the belt and teeth in the small diameter sprocket. The present invention results in a sprocket having a number of "virtual" teeth equal to or greater than the number of actual teeth, i.e., doubling or multiplying the number of teeth in a sprocket. The sprocket having the virtual teeth does not require additional lugs on the belt. The virtual teeth reduce the displacement error and mismatch inherent in the drive with fewer teeth in the sprocket, thereby providing accurate web feed with a low cost drive mechanism.

A drive mechanism in accordance with the invention provides orthographic motion of the belt lugs, as they enter the sprocket receptacles. The location of the radius is selected so that the lugs enter without significant mismatch and without interference and impacting against the receptacle surface. The radius location is selected to accommodate the difference in the pitch of the lugs on the belt from the pitch of the receptacles. Specifically, a fulcrum is located, either projecting from the sprocket or the side of the belt which faces the sprocket, so that the fulcrum is located at a distance from the center of the receptacle greater than the width of the lug. Preferably, however, in order to provide for bidirectional feed of the belt, the fulcrum is located at the iso-interpitch points between the receptacles' teeth. In the case of greater virtual teeth than actual, locations of virtual teeth are where an actual tooth would be. This location is an iso-interpitch spacing between the edges of adjacent receptacles. The fulcrum also induces the arch formed by the belt when the lugs are fully engaged with the receptacles. In effect the fulcrums define virtual teeth of the sprocket. The belt bends as it flexes about the fulcrum. The fulcrum is above the circumference of the sprocket and lies above the pitch circle of the belt. Therefore, as the belt tilts about the fulcrum, the incoming lug rotates about a constant radius, starting at the fulcrum. The motion of the incoming lug and the sprocket are synchronous and there are no impact forces generated due to mismatch of velocity of the sprocket and the lugs. The force transmitting surfaces of the lug and sprocket remain perpendicular to each other and to the direction of belt feed. This optimizes the force and torque transfer, and reduces the torque requirements of the drive motor. The belt nevertheless has a long span. Since the spring rate of the belt is a function of its flexural ability, the spring rate can be increased. The drive system, therefore, has a high spring rate and a very high resonant frequency, which is far above the stepping rate of the system including the belt. The belt can therefore be driven at very high stepping rates without the adverse effect of resonances in and resonant vibrations of the belt.

It is preferable to provide the fulcrums in the form of projections from the circular periphery of the sprocket, rather than on the belt. The projections may be of various cross-sectional shapes, for example, rectilinear. The surface of the projections which engage the belt are desirably of sufficient width and are circular arcs in shape so as to reduce the stresses on the belt. These surfaces, for example may have a width equal to approximately up to one-third of the length of the tooth in the circumferential direction around the sprocket periphery.

The present invention therefore provides an improved drive mechanism suitable for use in a wide variety of belt and sprocket drive mechanisms, including timing belt drives, and which is especially suitable for use in the belt sprocket drive of a web feed tractor.

It is a principal feature of the invention to provide an improved belt-sprocket drive mechanism which effectively increases the number of sprocket teeth and reduces the error caused by interference between the sprocket teeth and the lugs on the belt which are driven with the sprocket.

Another feature of the invention is to provide a drive mechanism which improves the flexure life of the belt, and which allows the use of belts having fewer lugs and sprockets having fewer teeth without sacrificing the smooth transmission of power.

It is a further feature of the invention to provide an improved sprocket drive wherein resonance effects which deteriorate the performance of the drive under high speed, high acceleration conditions are reduced. It is a further feature of the invention to provide an improved drive mechanism wherein the foregoing and other advantages are achieved in a simple and cost effective manner.

The foregoing and other objects, features and advantages of the invention as well as a presently preferred embodiment thereof will become more apparent from a reading of the following description in connection with the accompanying drawings in which.

Figure 9:
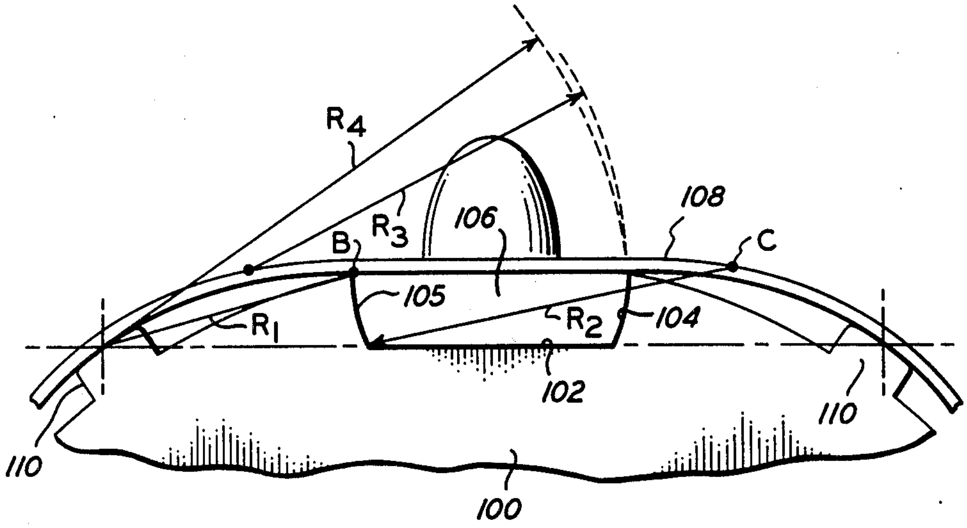
Figure 10:
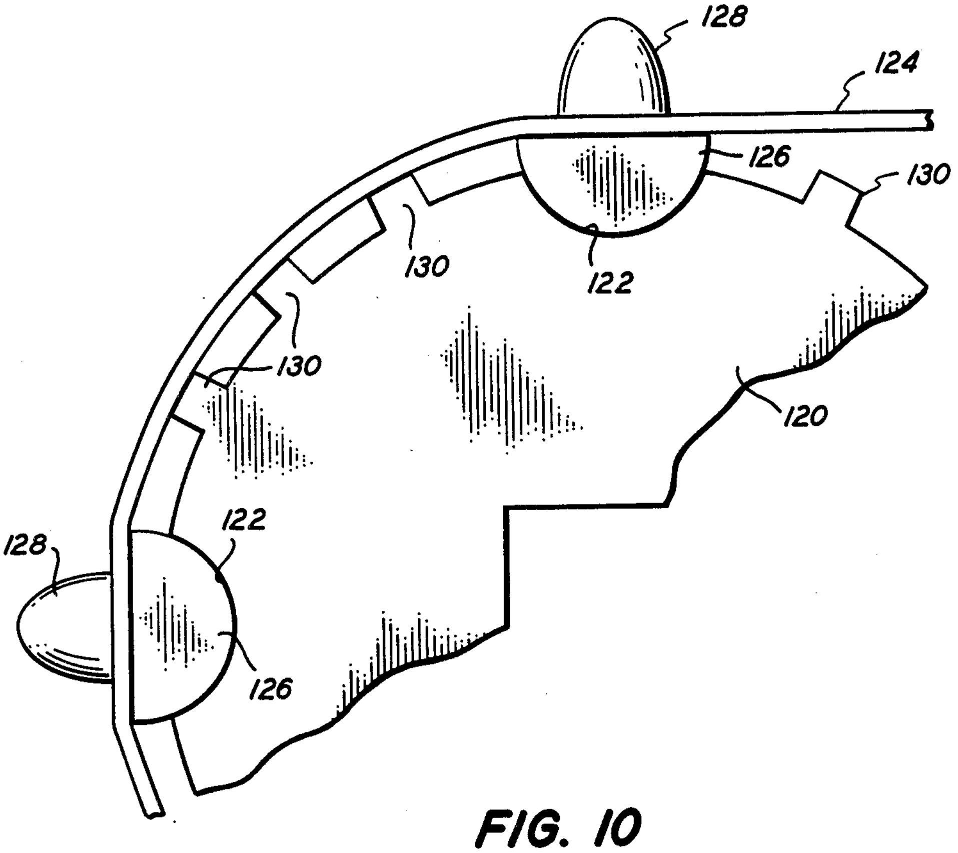

FIG. 9 is a fragmentary, enlarged view of a portion of the sprocket and belt of a transmission in accordance with another embodiment of the invention where the shape of the faces of the lug and receptacle define positive (convex) curves or involute curves; and FIG. 10 is a fragmentary, enlarged view of a portion of the sprocket and belt where a plurality of fulcrum projections are provided between the receptacles to provide a plurality of virtual teeth for each actual sprocket tooth.

Figure 1:
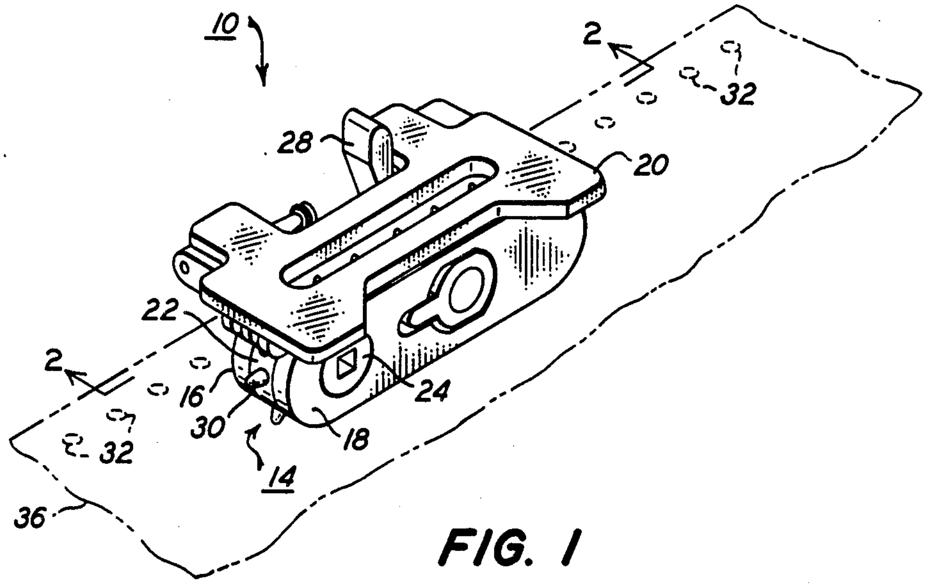
FIG. 1 is a perspective view of a document feed tractor embodying the invention.
Figure 2:
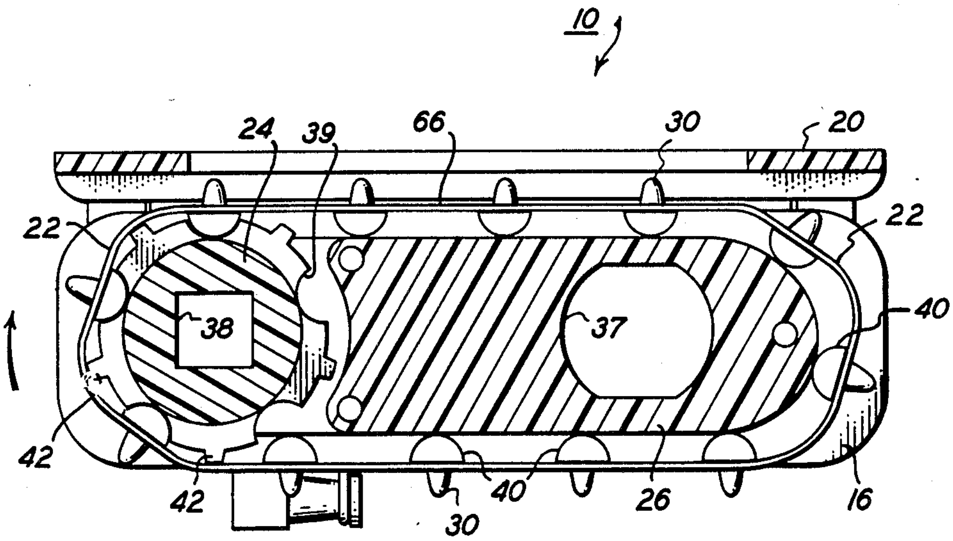
FIG. 2 is a sectional view of the tractor shown in FIG. 1, the section being taken along the vertical plane in FIG. 1 between the side plates along the line 2—2.

Referring first to FIGS. 1 and 2, there is shown a document feed tractor of the type which is illustrated in U.S. Pat. No. 4,119,091 issued Apr. 27, 1982 to L. J. Hubbard. The tractor is designated generally by the reference numeral 10 and has a frame 14 with two side plates 16 and 18. A lid 20 is pivotly mounted on the rear side plate 16. A belt 22 is captured between the side plates. The belt 22 is driven by a sprocket 24 and guided and supported by support structure 26 of the frame 14. A clamping mechanism 28 receives a support shaft and enables the tractor to be located across the width of the web so that the pins 30 on the tractor belt 22 are in alignment with perforations 32 in the document or paper 36, shown in phantom in FIG. 1. The clamping mechanism is not shown in FIG. 2 except for the opening 37 through which it passes in order to simplify the illustration in FIG. 2. Further information respecting the design of the tractor maybe obtained by reference to the above mentioned U.S. Pat. No. 4,119,091 as well as the other patents mentioned above.

The sprocket 24 has a square hole 38 for receiving the drive shaft. The sprocket also has five hemi-cylindrical receptacles 39 which receive hemi-cylindrical drive rollers or lugs 40 of the belt 22.

The sprocket 24 is provided, in accordance with the invention, with projections 42 which extend upwardly from the outside circumference of the sprocket preferably midway between the receptacles. The portion of the sprocket from which the projections 42 extend maybe thought of as the virtual teeth of the sprocket. The projections induce the arched portions of the belt between the lugs 40 when the belt is on the sprocket. The projections in the portions between the lug entering the sprocket as well as the lug leaving the sprocket define fulcrums about which the belt bends over a constant radius. The entering lug is then guided into the next receptacle in the sprocket so that it enters smoothly and without interference.

The projections 42 effectively provide additional sprocket teeth so that the five-tooth sprocket shown in FIGS. 1 and 2 is made effectively into a ten-tooth sprocket, and the transmission is effectively as smooth as would be obtained from a sprocket having five additional receptacles and a belt having lugs between the lugs with the pins 30 as shown in FIGS. 1 and 2.

While it is preferable to provide the projections on the sprocket they may be provided, instead, on the belt between the lugs. The height of the projections with respect to the pitch circle of the sprocket and the location of the fulcrums, which are provided by the projections, with respect to the receptacles 39 are important in obtaining the smooth, efficient transfer of power in the sprocket-belt transmission. The shape of the projections is also important in enabling the circulation of trapped air or other fluid between the belt and the sprocket and to properly distribute these stresses in the arched portions of the belt between the lugs 40. These considerations will become more apparent from the following description. If another idler sprocket is used instead of the circularly curved portion of the guide surface, it will be designed like the sprocket 24.

Figure 3:
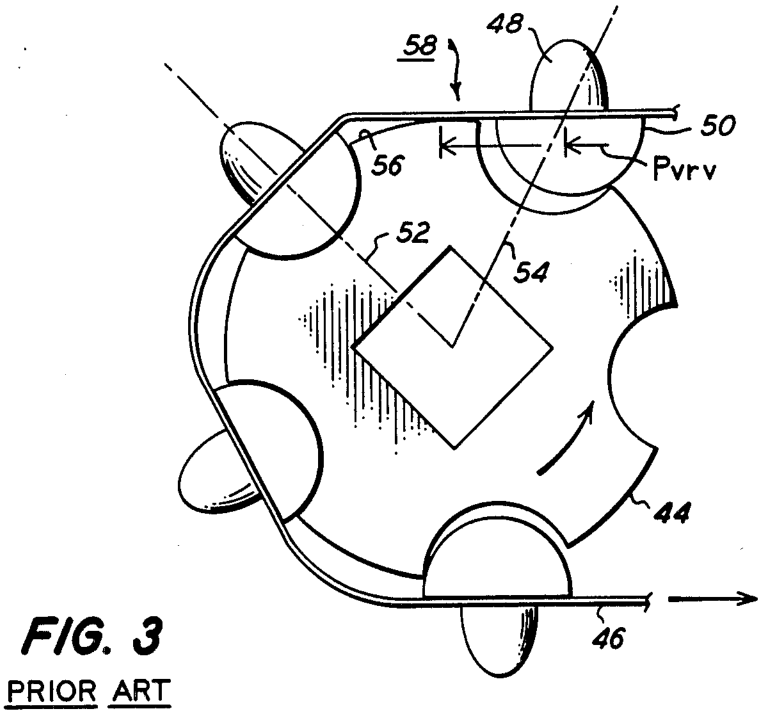
FIG. 3 PRIOR ART
FIG. 3 is a side view of a sprocket-tractor belt transmission, of the type used heretofore (the view being marked "prior art")
Figure 4:
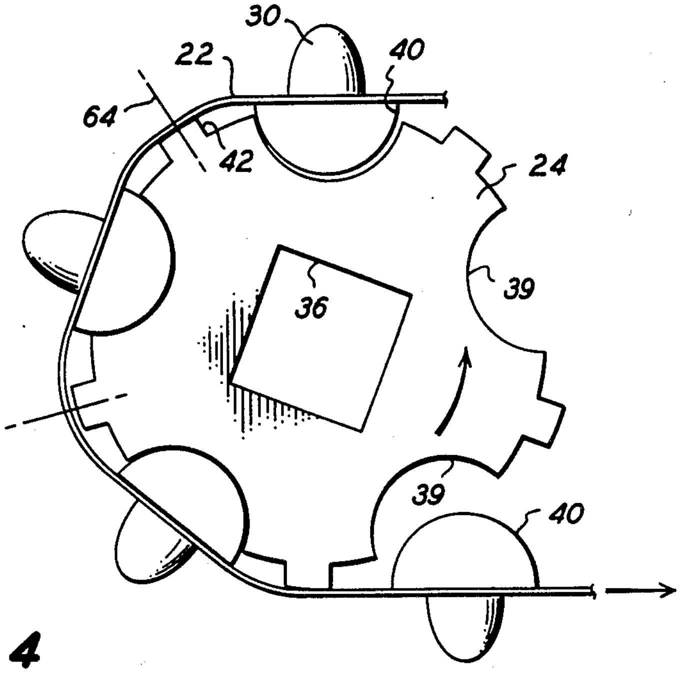
FIG. 4 is a view of a tractor belt sprocket transmission of the type shown in FIG. 2, wherein the belt and sprocket are in the same position as in the prior art configuration shown in FIG. 3 so as to make more apparent the advantages provided in accordance with the invention.

Referring to FIGS. 3 and 4, there is shown a sprocket 44 and belt 46 of the type which has been in use prior to the present invention. There are five teeth on the sprocket. The pitch of the driving elements measured between the centers of the pins and lugs 48 and 50 is different from the pitch of the sprocket, which is measured along the sprocket outside circumference over the sector between the radii 52 and 54. The portion of the belt between the engaged lug and the incoming lug contacts the peripheral surface 56 of the sprocket with a diminishing radius indicated as $P_{vrv}$. There is, therefore, a mismatch between the surface of the incoming tooth and the receptacle receiving it, as shown at 58 in FIG. 3. This mismatch can cause the spacings between different lines on the document fed by the tractor to be different from line to line. In other words, the accuracy of feeding of the document is adversely effected. Moreover, the smoothness of the transmission is adversely effected and the belt may stutter as the incoming teeth attempt to seat themselves in the receptacles of the sprocket 44.

In addition, force is wasted in seating the incoming lugs, the effective components of the force not being in the driving direction; i.e., perpendicular to diameters of the sprocket through the center of the receptacles or tangent to the surface of the lug. The shape of the lugs and the receptacles for providing maximum transfer of power is limited by shapes which can seat themselves. Thus, lug and receptacle shapes which are optimal for the transmission of force between the belt and the sprocket are not usable.

In a sprocket belt transmission provided by the invention, such as shown enlarged in FIG. 4, the incoming tooth enters the succeeding receptacle with essentially orthographic motion in that the belt bends about a fulcrum defined by the projection 42. The height of the projection above the pitch line accommodates the arches which the belt forms in the portions thereof between lugs which are seated in the receptacle. The fulcrum's are provided at the top surfaces of the projections. These surfaces are curved so as to follow essentially the curvature of the arches. The height of the fulcrum is such as to make up for any difference between the pitch of the belt and the pitch of the sprocket. The radius along which the belt moves between the fulcrum and the center of the lug is constant because the height of the lug is sufficient to accommodate any difference in pitch.

The projections may be of a shape to fill the area between the arch portions of the belt and the peripheral surface of the sprocket teeth. However, it is desirable to use rib-like projections. The length of the ribs is parallel to the axis of the sprocket. The width of the ribs desirably does not exceed about one-third the distance along the periphery between the receptacles (i.e., one-third of the width of the teeth in the direction of rotation of the sprocket).

Figure 5:
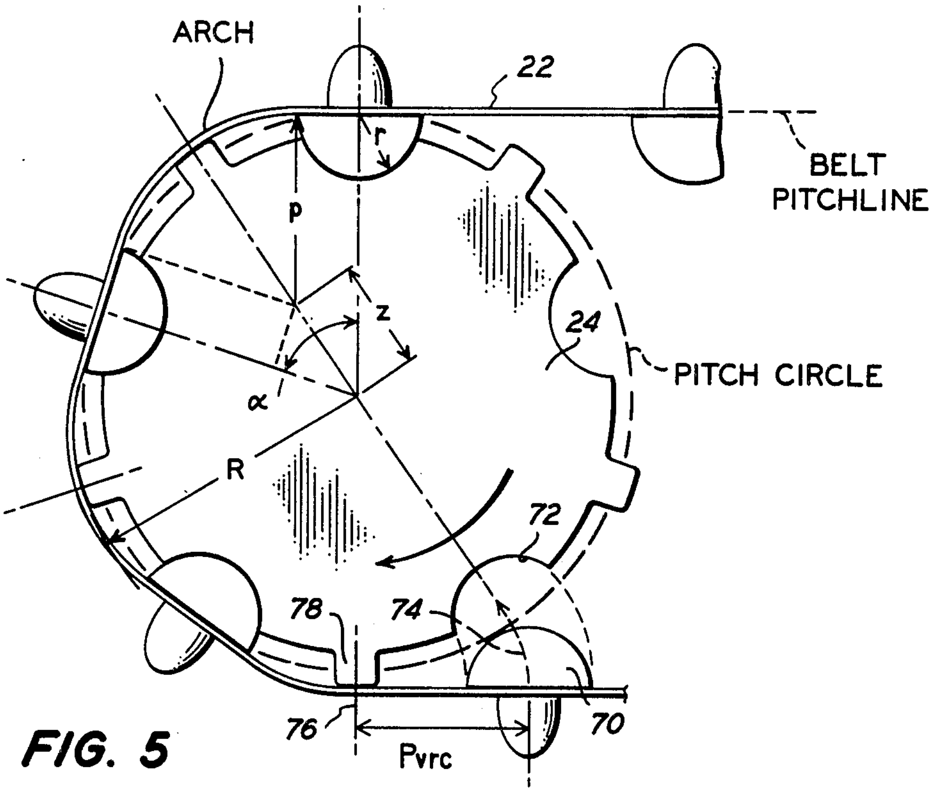
FIG. 5 is a side view of a sprocket-belt transmission in accordance with the invention illustrating the various angles, diameters and circles which are considered in the design of such transmissions.

In order to provide orthographic motion of the incoming lug, it is desirable that the constant radius ($P_{vrc}$), which is indicated best in FIG. 5, which is measured to the center of the lug, be greater than the width of the lug. This permits the fulcrum to be located further away from the midpoint of the sprocket tooth in the direction of rotation of the sprocket. However, it is desirable to locate the fulcrum (the center of the projection as indicated by the line 64 in FIG. 4) midway between the receptacles. This location will accommodate bi-directional feeding of the belt and of course bi-directional feeding of the document which is engaged by the pins 30 of the belt. The projections provide the additional feature of providing a couple which unflexes the belt along an orthographic path, as the belt leaves the sprocket. The outgoing lug is initially parallel to the central axis of the receptacle and then moves about the radius $P_{vrc}$ until it reaches the linear path where the belt is supported so as to travel along a straight line, as shown at 66 in FIG. 2.

Figure 6:
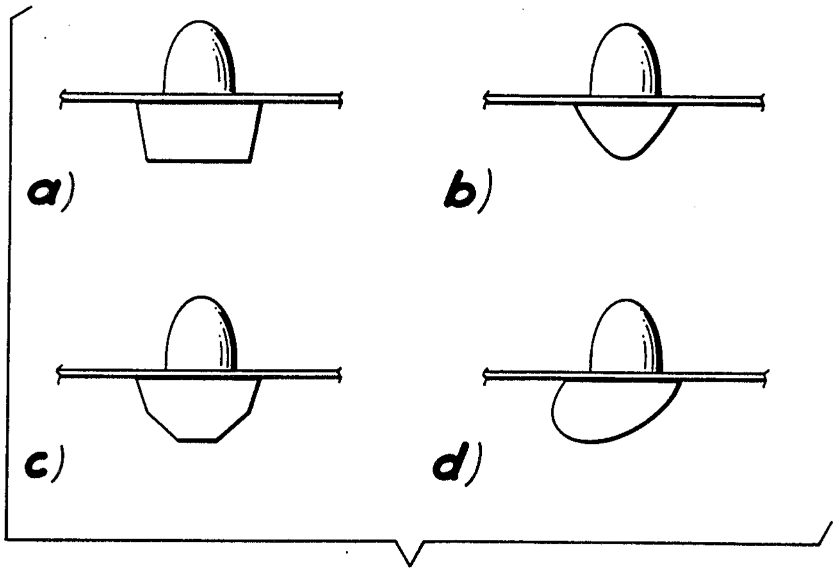
FIG. 6 are diagrammatic views of the lug shapes which may be used in accordance with the invention, the receptacles (not shown) also being similar in shape so as to receive the lugs.
Figure 7:
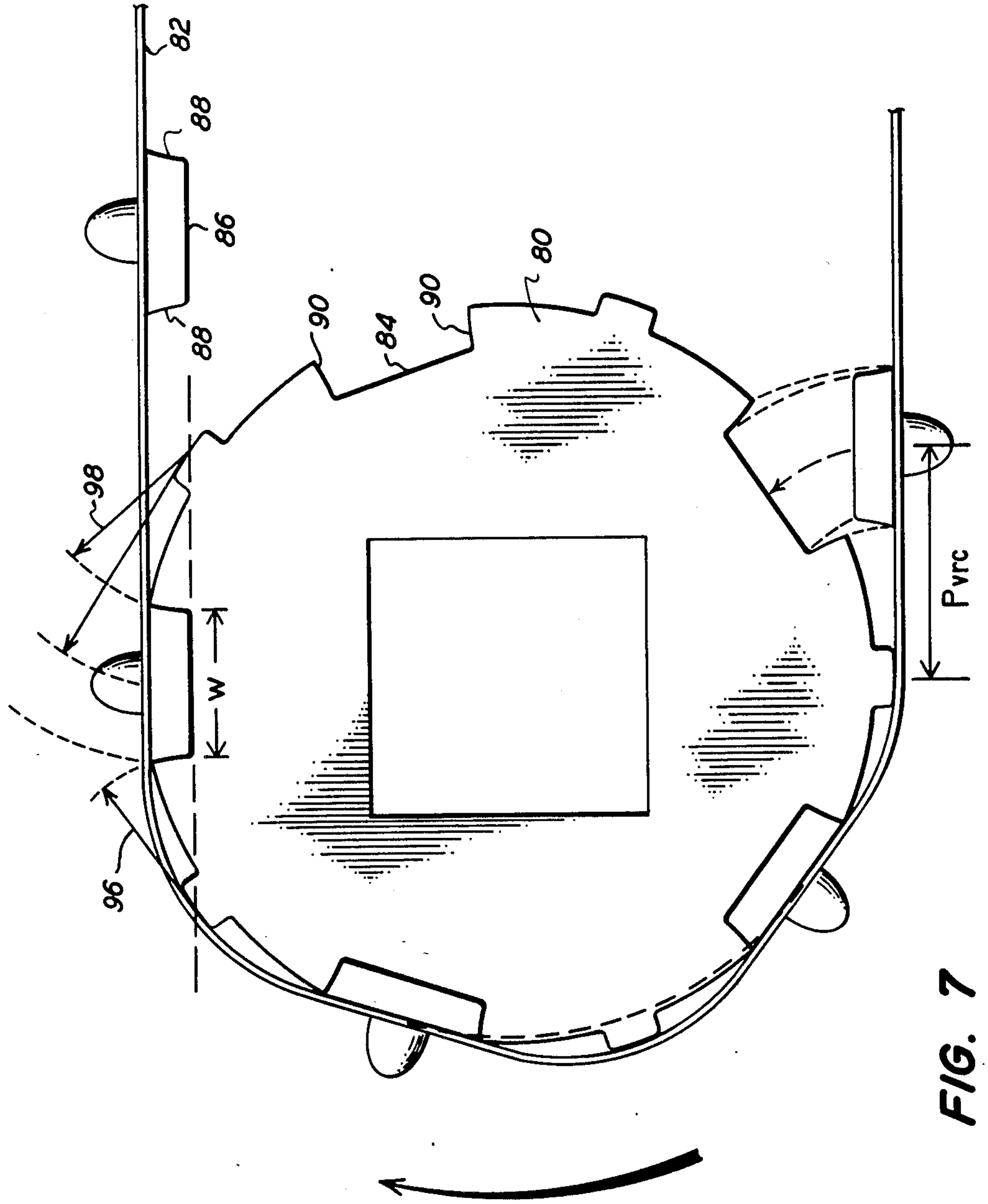
FIG. 7 is a side view of a sprocket-belt transmission in accordance with another embodiment of the invention wherein the lugs and receptacles have faces which are of negative (concave) involute or concave curve shapes.
Figure 8:
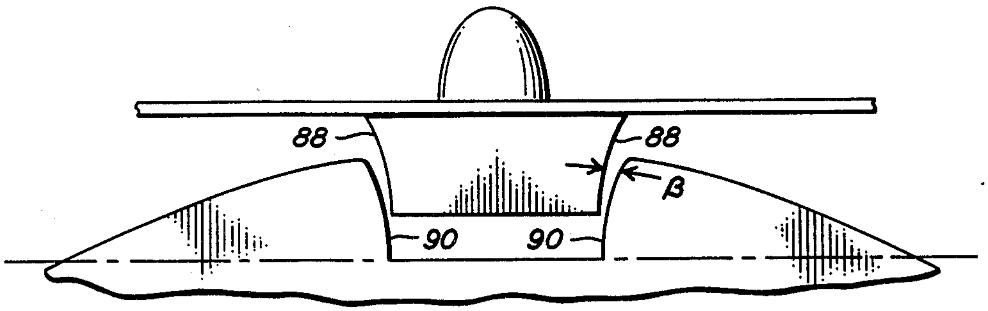
FIG. 8 is a fragmentary, enlarged view of a portion of the sprocket and a portion of the belt of the transmission shown in FIG. 7 illustrating the lug just entering or just leaving the receptacle in the sprocket.

By virtue of the orthographic motion of the lugs, the shapes thereof are not restricted to hemispherical or trapezoidal, but can be any shape from a positive curve or involute (convex) to a negative curve or involute (concave); the negative and positive curves being with respect to the center of the lug. Some of such shapes are illustrated in FIG. 6. FIG. 6*a* shows a trapezoidal lug. FIG. 6*b* shows a lug of a positive involute shape, similar to the shape of the pins on the topside of the belt. FIG. 6*c* shows a lug which is made up of two trapezoids. FIG. 6*d* shows a cycloidal shape. Shapes such as shown in FIG. 6*d*, which are nonsymmetrical with respect to the center of the lug, are suitable for unidirectional drives, as opposed to bidirectional drives. Lugs with driving surfaces which are negative involutes or arcs are shown in FIGS. 7 and 8. A lug shape having its driving surfaces as positive involutes or arcs is shown in FIG. 9.

The efficiency of transmission of force depends upon the pressure angle which the driving face of the lug makes with a line intersecting the driving face and perpendicular to a tangent to the periphery of the sprocket. For trapezoidal lugs, the pressure angle is one half the angle which is formed by the intersection of planes extending downwardly from these faces. Typically, trapezoidal lugs have pressure angles of 20°. The effective force varies with the cosine of the pressure angle. The invention allows the pressure angle to be very small, almost 0°, to maximize the mechanical advantage of the drive, especially with positive and negative curves or involute shapes as shown in FIGS. 8 and 9. Moreover, with negative involute shapes such as shown in FIG. 8, the curvature of the faces of the lugs and receptacles enables these faces to come into contact with each other with a sliding motion which minimizes friction especially for plastic to plastic or plastic to metal interfaces. In the preferred embodiment of the belt-sprocket transmission provided by the invention, the lugs and the sprocket are both made of like metal or plastic material, or dissimilar combinations such as polycarbonate plastic which is filled with Teflon (polyflurethylene) particles.

Referring to FIG. 5 the sprocket 24 is shown without the hole for receiving the drive shaft in order to simplify the illustration. The belt 22 has its pitch line indicated by the broken line which extends around the pitch circle (also indicated by the broken line) of the sprocket 24. The pitch line of the belt is taken, as is conventional, midway of the thickness of the belt. The lugs have a radius centered at the intersection of the center line through the lug and the pitch line, indicated as "r". The incoming lug is shown at 70. The lug follows an orthographic path into the incoming receptacle shown at 72. The path is indicated by the broken line 74. Bending of the belt occurs about the fulcrum at the center line 76 of the projection 78 adjacent to the incoming receptacle 72.

The belt is preferably composed of material having a substantially constant modulus of elasticity, such as polyamide (Kapton) or steel. The cross section of the belt is constant. A constant bending moment is provided by the couple at the edges of adjacent lugs on opposite sides of the arch portion. Since the modulus of elasticity, bending moment and moment of inertia (defined by the constant cross section) of the belt are constant, the arch is an arc of a circle (see F. B. Seely, Resistance of Materials, Third Edition, John Wiley and Sons, Publishers (1947), pages 138 and 139). The radius of the arch $\rho$ is then equal to the pitch of the belt (the length along the pitch line between the center of the lugs which is within the arc of the tooth angle $\alpha$ shown in FIG. 5) from which a roller diameter is subtracted, multiplied by the number of teeth (five teeth in the sprocket belt drive illustrated in FIG. 5) divided by $2\pi$. One-half the belt thickness is subtracted from this result to obtain $\rho$. In effect, $\rho$ is the radius of a circle which is made up of five arcs each of the length of an arch portion.

The radius of the fulcrum (the pivot radius indicated by "R") is equal to $\rho$ plus Z, which is the distance along a radial line through the fulcrum at the center of the projection. Z is obtained by dropping a perpendicular from the diameter of the lug which intersects the radial line through the center of the sprocket to the fulcrum. It will been seen that a Z defines center of the arch has a length equal to the radius of the lug r, divided by the sine of $\frac{1}{2}$ the pitch arc angle $\alpha$. The height of the fulcrum, the height of each projection, such as the projection which defines the radius $P_{vrc}$ is, the difference between R and the radius of the pitch circle. It is desirable that the fulcrum be slightly less than R so as to assure that, with manufacturing tolerances, the projection does not increase the radius $\rho$ of the arch and thereby shorten $P_{vrc}$ so as to cause any mismatch which could bring the leading edge of the lug 70 into engagement with the surface of the receptacle 72. Accordingly, it is preferable, in for example a sprocket that has a pitch diameter of less than 1 inch, that the height of the projection and the location of the fulcrum be equal to R less half the thickness of the belt less a safety factor of approximately the chordal rise of the projection. Then the arch will be supported and the belt will bend about a radius which will cause the incoming lug to execute essentially orthographic motion into the incoming receptacle 72 without substantial interference.

It will be apparent therefore that the projections provide virtual teeth in the sprocket and double or multiply the number of sprocket teeth without multiplying the number of lugs on the belt or decreasing the effective stiffness of the belt. The belt stiffness is therefore high thereby placing resonant frequencies of the system well above the highest step rates at which the belt is driven. This avoidance of resonant vibrations further enhances the smoothness of the transmission of force from the sprocket to the belt in driving the belt.

The fulcrum surface of the projections is desirably along an arc of approximately the radius equal to $\rho$. The length of the projection (the area of the projection which supports the arch) is desirably less than one-third of the width of the space (between the adjacent receptacles). The projections therefore support the arch over a wide area and reduce stresses in the belt at the projections.

It will also be observed that the projection adjacent to the lug leaving the sprocket unflexes the belt along an orthographic path, and assists the lugs in clearing the sprocket receptacle. The projections insure that the belt does not contact the peripheral surface of the sprocket, and keeps the pitch line above the peripheral surface of the sprocket.

Referring to FIG. 7, there is shown a transmission utilizing a sprocket 80 and a belt 82 of negative curved shape. In other words, the drive surfaces 88 of the lugs and the drive surfaces 90 of the receptacles are negative curves and are concave with respect to lines through centroids thereof. The curvatures of these drive surfaces are defined by arcs having radii at the fulcrums. The fulcrums are the pivots which are at the intersection of the top surfaces of the projections and radii to the axis of the sprocket 80 through the center of these projections. In other words, the pivots are essentially at the iso-interpitch spacing of the receptacles, and are at the midpoints in FIG. 7. These arcs are indicated as being defined by the path of the tooth face radii 96 and 98 in FIG. 7. These tooth face radii are equal to 2 pitch chords of the adjacent fulcrums less the thickness W of the receptacles divided by 2. The active radius about the fulcrum pivot is $P_{vrc}$. Preferably the receptacle width W is approximately equal to one-third of the chord of the pitch circle of the sprocket. The height of the projections above the pitch circle is desirably from 1 to 6 percent of the pitch radius, in a transmission having negative involutes or other compatible shapes.

It will be observed from FIG. 8 that the angle $\beta$ between the lug surfaces 88 and the receptacle surfaces 90 is approximately 1° to 2°. The surfaces also provide cam action due to their shape which facilitates their inter-engagement. Moreover, the pressure angle of these surfaces may be far less than 20°, for example from 19.9° to 0°.

Driving force and torque capacity of the drive system (the motor which drives the sprocket) is not required in order to maintain the lugs seated in the receptacles. Torque is not required to overcome forces tending to displace the lugs out of the sprocket receptacles, since all forces are orthographic and along vectors close to the center of the belt.

Referring to FIG. 9, there is shown a portion of a sprocket 100 with a receptacle 102 having driving surfaces 104 of positive curved shape. The lug 106 on the belt 108 has a complementary shape to fit, without interference, into the receptacle 102. The width of the receptacle may be designed in accordance with the procedures discussed above in connection with the negative curved shape shown in FIG. 7. The positive curved shape of the drive surfaces may be obtained by tooth face radii indicated at $R_3$ for the right-hand face 104 which extend from points on the circle of pitch radius $\rho$. The center C of the radius $R_2$ which defines the face 105 is located a distance $R_2$ from point B. Point B is located by the intersection of radius $R_1$ and a circle having the radius of the pitch circle less one-half the thickness of the belt 108. The curves defined by the radii $R_1$ and $R_2$ will provide clearance of the lug surfaces which engage the tooth face surfaces 104 and 105, since these arcs are referenced to a circle through the fulcrums of the projections 110, and therefore must lie along clearance arcs defined by radii, such as $R_4$ from the fulcrums.

The pressure angles of the positive involute lug and receptacle shapes shown in FIG. 9 are also very low, for example from 0° to 19.9°, and provide for efficient transmission of force between the sprocket and the belt.

FIG. 10 shows a sprocket 120 having but four teeth and receptacles 122, and a belt 124 similar to the belt 22 (FIG. 4) with lugs 126 and pins 128. A plurality of projections 130 are disposed at a plurality of iso-interpitch points (equally spaced in this example) along the sprocket circumference. This provides for a plurality of virtual teeth for each actual tooth. The location of the projections and the projections themselves may be designed as discussed above in connection with FIG. 5.

From the foregoing description, it will be apparent that there has been provided improved sprocket-belt transmission mechanisms which are especially adapted for use in document feed tractors and other drive systems or transmissions. Various embodiments of these mechanisms have been illustrated. However, variations and modifications thereof, within the scope of the invention, will undoubtedly suggest themselves to those skilled in the art. Accordingly, the foregoing description should be taken as illustrative and not in a limiting sense.

I claim:

1. In a drive mechanism having a member with longitudinally spaced drive elements and a sprocket with receptacles spaced along the periphery thereof which receive and engage said drive elements as said sprocket rotates, the improvement comprising a plurality of projections on either the periphery of said sprocket between said receptacles or on said member between said drive elements, said projections being of such a height in a direction radially of said sprocket to bring said drive elements into registry with said receptacles as said drive members are received therein.

2. The invention according to claim 1 wherein said projections, each define a fulcrum about which the portions of said members, between the elements received in one of such receptacles and the next element moving into the succeeding receptacle, bend about a constant radius between said fulcrum and said next element as said next element moves into said succeeding receptacle.

3. The invention according to claim 2 wherein said sprocket has actual teeth between said receptacles and said projections define virtual teeth between said receptacles thereby effectively increasing the number of sprocket teeth by the number of said virtual teeth to provide for smoother transmission of motion between said member and sprocket than with sprocket teeth equal in number to the number of said actual teeth.

4. The invention according to claim 3 wherein said member is flexible and said projections constrain said portions of said member into arcs the opposite ends of which are at the elements received in successive receptacles.

5. The invention according to claim 4 wherein said projections are of a height not exceeding the differential radial height between the arc of said members formed by said elements in said sucessive receptacles and the arc along the pitch diameter of said sprocket.

6. The invention according to claim 4 wherein the distance along the circumference of said sprocket from said fulcrum to the farthest edge of the succeeding receptacle which receives the next arriving element is greater than the width of said next arriving element.

7. The invention according to claim 4 wherein said projections are located so that said fulcrums are placed or fall at iso-interpitch positions midway between said receptacles.

8. The invention according to claim 7 wherein said projection positions are midway between said receptacles.

9. The invention according to claim 7 wherein a plurality of said projections are provided between said elements or between said receptacles.

10. The invention according to claim 2 wherein said member is a flexible belt, said elements are lugs, said receptacles are slots of shape matching the shape of said lugs and travel around the pitch circle of said sprocket about the center of rotation of said sprocket so that said portions of said belt between said lugs on said sprocket defines arches of maximum height in a direction radially of said sprocket greater than the radius of said pitch circle, said projections having a height which extends above said pitch circle for inducing said arches.

11. The invention according to claim 10 wherein said lugs and receptacle slots are hemi-cylindrical in shape and flat along surfaces through diametral planes, said belt lying flat on said flat surfaces of said hemi-cylindrical lugs such that said arches extend between edges of the diametral planes of adjacent ones of said lugs which are in said slots on said sprockets.

12. The invention according to claim 8 wherein said projections are ribs, the height of which are equal to said height of said projections, said ribs being attached to said periphery of said sprocket, the width of said ribs extending between said slots not exceeding about one-third the distance along said periphery between said slots.

13. The invention according to claim 10 wherein the top surface of said ribs is along a cylindrical surface having its center line coincident with said axis of rotation of said sprocket and having a radius approximately equal to or less than the radius of said arches.

14. The invention according to claim 10 wherein the length of said portions of said belt between said lugs is greater than the distance along the periphery of said sprocket between adjacent receptacles.

15. The invention according to claim 10 wherein said lugs and receptacles have shapes such that the pressure angles thereof are equal to or almost 0°.

16. The invention as set forth in claim 10 wherein said lugs and receptacles have faces which are generally concave with respect to the center thereof.

17. The invention according to claim 16 wherein said faces are of negative involute curvature.

18. The invention according to claim 16 wherein said faces are defined by arcs centered at the fulcrums on opposite sides of said receptacles.

19. The invention according to claim 16 wherein said faces of each said lug and receptacle have curvatures selected from concave and convex curvatures which mate when said lug is rotated into said receptacle about a constant radius greater than the width of said lug.

20. In a tractor for feeding edge perforated webs and having an endless belt of flexible material having pins and lugs extending in opposite directions from said belt, said pins being receivable in said perforations of said web, a sprocket having receptacles for engaging said lugs, of shapes matching the shapes of said lugs, the distance along portions of said belt between said lugs being greater than the distance along the periphery of said sprocket between said receptacles, the improvement comprising plurality of projections on one of the surfaces of said belt facing the periphery of said sprocket and the periphery of said sprocket defining fulcrums of height sufficient to induce arches in said portions of said belt and to direct said lugs which enter said receptacles into registry therewith.

21. The invention according to claim 20 wherein said portions, of said belt on said sprocket define arches of height which extend above the pitch circle of said sprocket, said projections extending above said pitch circle approximately up to the maximum altitude of said arches for supporting said arches.

22. The invention according to claim 21 wherein said projections are ribs extending parallel to the axis of rotation of said sprocket.

23. The invention according to claim 22 wherein the surfaces of said ribs which support said arches being along a cylindrical arc defined by radii having centers spaced from said axis.

24. The invention according to claim 23 wherein said ribs have widths along said sprocket periphery up to approximately one-third the distance between said receptacles.

25. The invention according to claim 24 wherein said lugs and receptacles are hemi-cylindrical in shape, said belt lying flat on the diametral surface of said hemi-cylindrical lugs.

26. The invention according to claim 20 wherein said fulcrums are located at iso-interpitch positions between said receptacles.

27. The invention according to claim 26 wherein said fulcrum positions are midway between said receptacles.

28. The invention according to claim 20 wherein a plurality of said fulcrums are located at iso-interpitch postions between said receptacles.

* * * * *